United States Patent
Wang et al.

(10) Patent No.: US 12,540,595 B2
(45) Date of Patent: Feb. 3, 2026

(54) TEST-BED FOR PUMP AS TURBINE TRANSITION PROCESS BASED ON DIGITAL TWINNING

(71) Applicant: Jiangsu University, Zhenjiang (CN)

(72) Inventors: Wenjie Wang, Zhenjiang (CN); Chenying Zhang, Zhenjiang (CN); Ji Pei, Zhenjiang (CN); Shouqi Yuan, Zhenjiang (CN); Yanjun Li, Zhenjiang (CN); Xingcheng Gan, Zhenjiang (CN); Jia Chen, Zhenjiang (CN)

(73) Assignee: Jiangsu University, Zhenjiang (CN)

( * ) Notice: Subject to any disclaimer, the term of this patent is extended or adjusted under 35 U.S.C. 154(b) by 0 days.

(21) Appl. No.: 19/215,063

(22) Filed: May 21, 2025

(65) Prior Publication Data

US 2025/0290482 A1  Sep. 18, 2025

Related U.S. Application Data

(63) Continuation of application No. PCT/CN2025/081531, filed on Mar. 10, 2025.

(30) Foreign Application Priority Data

Mar. 13, 2024  (CN) .......................... 202410284163.0

(51) Int. Cl.
  *F03B 11/00*  (2006.01)
  *F03B 13/06*  (2006.01)
  *F03B 15/00*  (2006.01)
  *G06F 30/17*  (2020.01)

(52) U.S. Cl.
  CPC ............ *F03B 11/008* (2013.01); *F03B 15/00* (2013.01); *G06F 30/17* (2020.01); *F03B 13/06* (2013.01);

(Continued)

(58) Field of Classification Search
  CPC ........ F03B 11/008; F03B 15/00; F03B 13/06; F06F 30/17; F05B 2260/83; F05B 2260/54
  See application file for complete search history.

(56) References Cited

U.S. PATENT DOCUMENTS

| | | | |
|---|---|---|---|
| 9,811,074 B1 | 11/2017 | Aichele | |
| 2009/0110563 A1* | 4/2009 | Takita | ..................... C02F 1/441 |
| | | | 417/399 |
| 2013/0038062 A1* | 2/2013 | Salu | ......................... F03G 7/00 |
| | | | 60/532 |

FOREIGN PATENT DOCUMENTS

| | | |
|---|---|---|
| CN | 110454290 A | 11/2019 |
| CN | 110456635 A | 11/2019 |

(Continued)

OTHER PUBLICATIONS

Cn 115688510A, Guo H, pp. 1-3; 2023-02-03 (Year: 2023).*

(Continued)

*Primary Examiner* — Michael J Dalbo
*Assistant Examiner* — Kaleria Knox
(74) *Attorney, Agent, or Firm* — AVEK IP, LLC

(57) ABSTRACT

A test-bed for a pump as turbine transition process based on digital twinning is provided, including a PAT physical model used for controlling the pump as turbine transition process and collecting data of the pump as turbine transition process; a PAT twinning data system used for processing the data of the pump as turbine transition process to obtain a measurement database; a PAT twinning virtual system used for carrying out numerical simulation on the pump as turbine transition process based on the measurement database to obtain a value obtained by numerical simulation of a PAT virtual system; and a PAT service system used for processing the value obtained by the numerical simulation of the PAT virtual system, obtaining an optimal operation strategy and (Continued)

feeding the strategy back to the PAT physical model, and updating the measurement database at the same time.

4 Claims, 4 Drawing Sheets

(52) U.S. Cl.
CPC ....... *F05B 2260/83* (2013.01); *F05B 2260/84* (2013.01)

(56) References Cited

FOREIGN PATENT DOCUMENTS

| | | |
|---|---|---|
| CN | 112417619 A | 2/2021 |
| CN | 115688510 A | 2/2023 |
| CN | 116557307 A | 8/2023 |
| CN | 117573731 A | 2/2024 |
| CN | 118013858 A | 5/2024 |
| CN | 118013858 B | 5/2024 |

OTHER PUBLICATIONS

Michael K. Kostner "Micro hydro power generation in water distribution networks through the optimal pumps-as-turbines sizing and control", pp. 1-16, Sep. 7, 2023 (Year: 2023).*

Sleiti "Digital twin in energy industry: Proposed robust digital twin for power plant and other complex capital-intensive large engineering systems", pp. 1-60, vol. 8 (Year: 2022).*

Cn117592300, Hu Yang, 2024/02/23, pp. 1-18 (Year: 2024).*

First Office Action, dated Jul. 30, 2024, 9 pages, issued in CN Patent Application No. 202410284163.0.

First Search Report, dated Jul. 26, 2024, 7 pages, issued in CN Patent Application No. 2024102841630.

Koster, M.K. et al., Micro hydro power generation in water distribution networks through the optimal pumps-as-turbines sizing and control, Applied Energy, Sep. 7, 2023, 16 pages, 351, www.elsevier.com/locate/apenergy, Bolzano, Italy.

Li, J. et al., The Start-up Characteristics of Pump as Turbine System During Different Valve Openings, Journal of Engineering Thermophysics, Dec. 2023, 13 pages, vol. 44, No. 12, http://www.cnki.net, Hangzhou, China.

Notification to Grant Patent Right for Invention, dated Sep. 13, 2024, 3 pages, issued in CN Patent Application No. 2024102841630.

Second Search Report, dated Sep. 6, 2024, 4 pages, issued in CN Patent Application No. 2024102841630.

International Search Report, dated Jun. 6, 2025, 7 pages, issued in corresponding PCT Application No. PCT/CN2025/081531.

* cited by examiner

TEST-BED FOR PUMP AS TURBINE TRANSITION PROCESS BASED ON DIGITAL TWINNING

CROSS-REFERENCE TO RELATED APPLICATIONS

This application is a continuation of PCT/CN2025/081531, filed on Mar. 10, 2025 and claims priority of Chinese Patent Application No. 2024102841630, filed on Mar. 13, 2024, the entire contents of which are incorporated herein by reference.

TECHNICAL FIELD

The disclosure belongs to the field of transition process tests, in particular to a test-bed for a pump as turbine (PAT) transition process based on digital twinning.

BACKGROUND

With the development of small hydropower, the application of PAT is more and more extensive. Many rural villages, mountainous areas, islands and other places are often damaged by some natural disasters, such as strong winds and heavy rains. However, due to the complex terrain in remote areas, it is difficult to maintain, and it often takes a long time to repair. Even in some remote areas, it is difficult to cover the power grid, so only some ready-made resources may be used for self-generation, such as solar energy, wind energy and biogas. Therefore, a new power system with new energy sources (wind power, solar energy, etc.) as the main body should be built according to local conditions. However, wind power and solar energy are typical high-quality energy and inferior electricity. There is fluctuation, intermittence and instability in power generation, so an energy storage device is needed to convert inferior electricity into usable electricity.

PAT mainly undertakes the functions of frequency modulation and phase modulation in small power systems and rapid response to power systems. Therefore, the PAT system needs to quickly judge and respond to the demand conditions. In this process, it is necessary for PAT to transition from one stable working condition to another, that is, PAT will be in an unstable transition process with rapid performance change. Previously, people mostly used empiricism to judge and adjust the transition process, which was slow in response and had great security risks.

SUMMARY

The purpose of the present disclosure is to provide a test-bed for a pump as turbine transition process based on digital twinning, so as to solve the problems existing in the above prior art.

In order to achieve the above purpose, the disclosure provides the test-bed for the pump as turbine transition process based on the digital twinning, including:

a PAT physical model, a PAT service system, a PAT twinning virtual system and a PAT twinning data system;

where the PAT physical model is used for controlling the pump as turbine transition process and collecting data of the pump as turbine transition process;

the PAT twinning data system is used for processing the data of the pump as turbine transition process to obtain a measurement database;

the PAT virtual system is used for carrying out numerical simulation on the pump as turbine transition process based on the measurement database to obtain a value obtained by numerical simulation of a PAT virtual system; and the PAT service system is used for processing the value obtained by the numerical simulation of the PAT virtual system, obtaining an optimal operation strategy and feeding the strategy back to the PAT physical model, and updating the measurement database at a same time until a target working condition is reached.

Optionally, the PAT physical model includes a PAT module, a booster pump module, a control system module and an acquisition module;

where the PAT module includes a lower water level tank, a static pressure sensor, an electromagnetic valve, a flowmeter, an upper water level tank and a variable frequency motor;

the booster pump module includes the lower water level tank, the electromagnetic valve, a booster pump, the static pressure sensor, and the upper water level tank;

the control system module includes a frequency converter, an energy feedback unit and an electric cabinet; and the acquisition module includes the static pressure sensor, a dynamic pressure sensor, a rotating speed torque sensor, an upper computer, an acquisition card and the rotating speed torque sensor.

Optionally, the upper water level tank is arranged on an adjustable height bracket and is provided with an overflow hole for cooperating with the water level tank to keep a liquid height difference unchanged;

the booster pump is used for lifting water in the lower water level tank into the upper water level tank to keep a water level in the upper water level tank at an overflow water level; and the flowmeter is installed at a pipe diameter 10 times from the upper water level tank to ensure an accuracy of flow rate measurement.

Optionally, the PAT twinning data system is also used to add data of the flow rate, the outlet pressure, the inlet pressure and the valve opening as a set of states to a database, and at the same time, the flow rate, pressure and torque values collected by the acquisition card are processed and transmitted to the PAT service system.

Optionally, the PAT twinning virtual system includes a numerical simulation module and a dynamic display module;

where the numerical simulation module is used for simulating the measurement database through a boundary condition calculation method, a boundary condition adjustment method, a numerical simulation method and a result preprocessing method; and the dynamic display module is used to display a twin system interface of the test-bed and a real-time data dynamic change interface.

Optionally, the PAT service system includes: a machine learning module, an optimal strategy selection module and a judgment module;

where the machine learning module is used for determining relationships among flow rate, outlet pressure, inlet pressure and valve opening through machine learning, and constructing a neural network model;

the optimal strategy selection module is used for searching a corresponding strategy through the neural network model and obtaining the optimal operation strategy; and the judgment module is used for judging a matching relationship between the valve opening and adjustment time, calculating response time of the optimal strategy and judging a rationality of a strategy selection.

Optionally, an expression of a strategy optimization mode of the optimal strategy selection module is:

$$Y\min=(\text{valve 1 opening'}-\text{valve 1 opening})^2+(\text{valve 2 opening'}-\text{valve 2 opening})^2;$$

where the valve 1 opening' is valve 1 target opening, and the valve 1 opening is valve 1 current opening; and the valve 2 opening' is valve 2 target opening, the valve 2 opening is valve 2 current opening, and Ymin is an evaluation index.

Optionally, the PAT service system is also used for evaluating a pressure pulsation value generated in the transition process of the numerical simulation, determining that an amplitude of a pressure pulsation is within a safe range, and after ensuring that a frequency of the pressure pulsation is inconsistent with a resonance frequency of a unit, transmitting a new valve opening to the PAT physical model.

The technical effects of the disclosure are as follows.

The purpose of this disclosure is to construct a set of experimental system based on digital twinning, which is suitable for the pump as turbine transition process. Through experimental research, the optimal strategy in the transition process may be found, and the small power system may respond quickly to ensure the stability and economy of the electric power system. In addition, the disclosure carries out experimental design on the extreme transition process, namely, the power-off transition process under the pump working condition, predicts the consequences of dangerous working conditions, and ensures the safety of PAT in actual operation.

BRIEF DESCRIPTION OF THE DRAWINGS

The attached drawings, which constitute a part of this disclosure, are used to provide a further understanding of this disclosure. The illustrative embodiments and descriptions of this disclosure are used to explain this disclosure, and do not constitute an improper limitation of this disclosure. In the attached drawings.

DETAILED DESCRIPTION OF THE EMBODIMENTS

It should be noted that the embodiments in this disclosure and the features in the embodiments may be combined with each other without conflict. The present disclosure will be described in detail with reference to the attached drawings and embodiments.

It should be noted that the steps shown in the flowchart of the attached drawings may be executed in a computer system such as a set of computer-executable instructions, and although a logical order is shown in the flowchart, in some cases, the steps shown or described may be executed in a different order from here.

Embodiment 1

Figure 1:
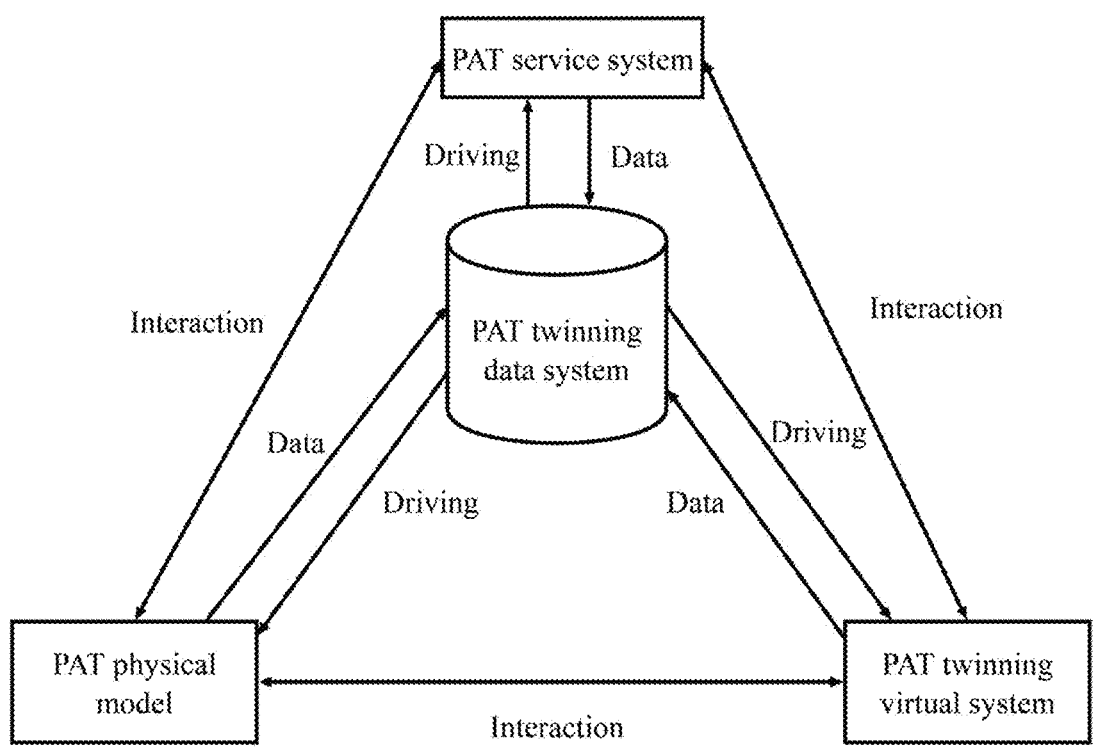
FIG. 1 is a logical diagram of a PAT digital twinning system in an embodiment of the present disclosure.
Figure 2:
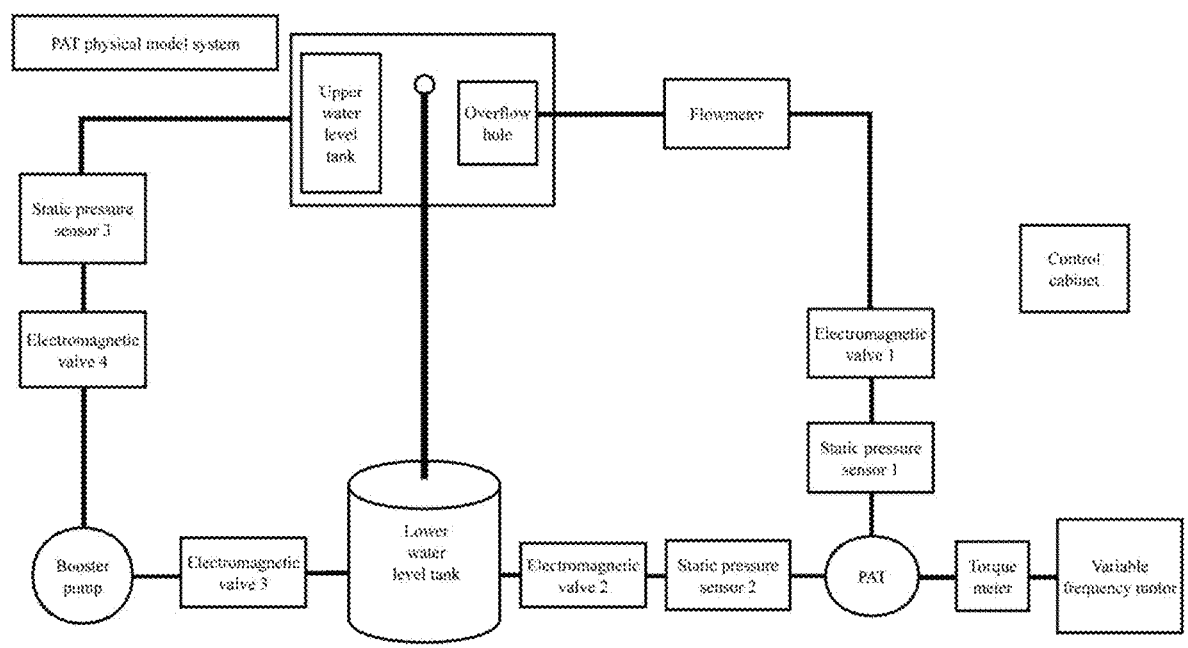
FIG. 2 is a schematic diagram of a PAT physical model system in an embodiment of the present disclosure.
Figure 3:
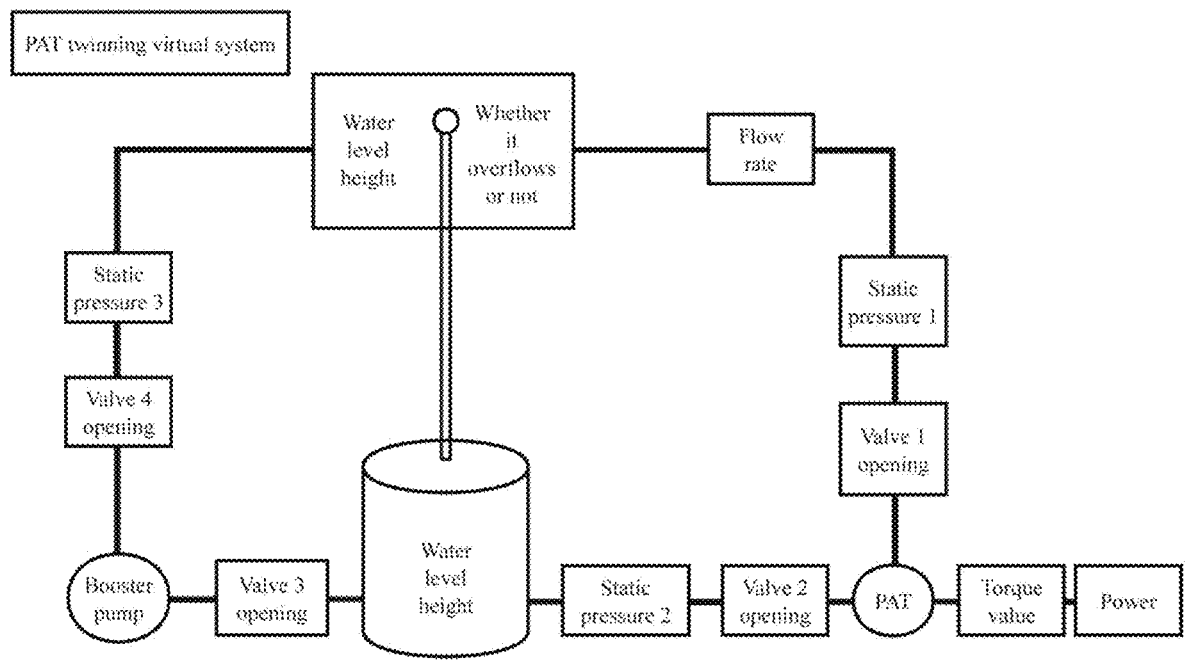
FIG. 3 is a schematic diagram of a PAT virtual system in an embodiment of the present disclosure.
Figure 4:
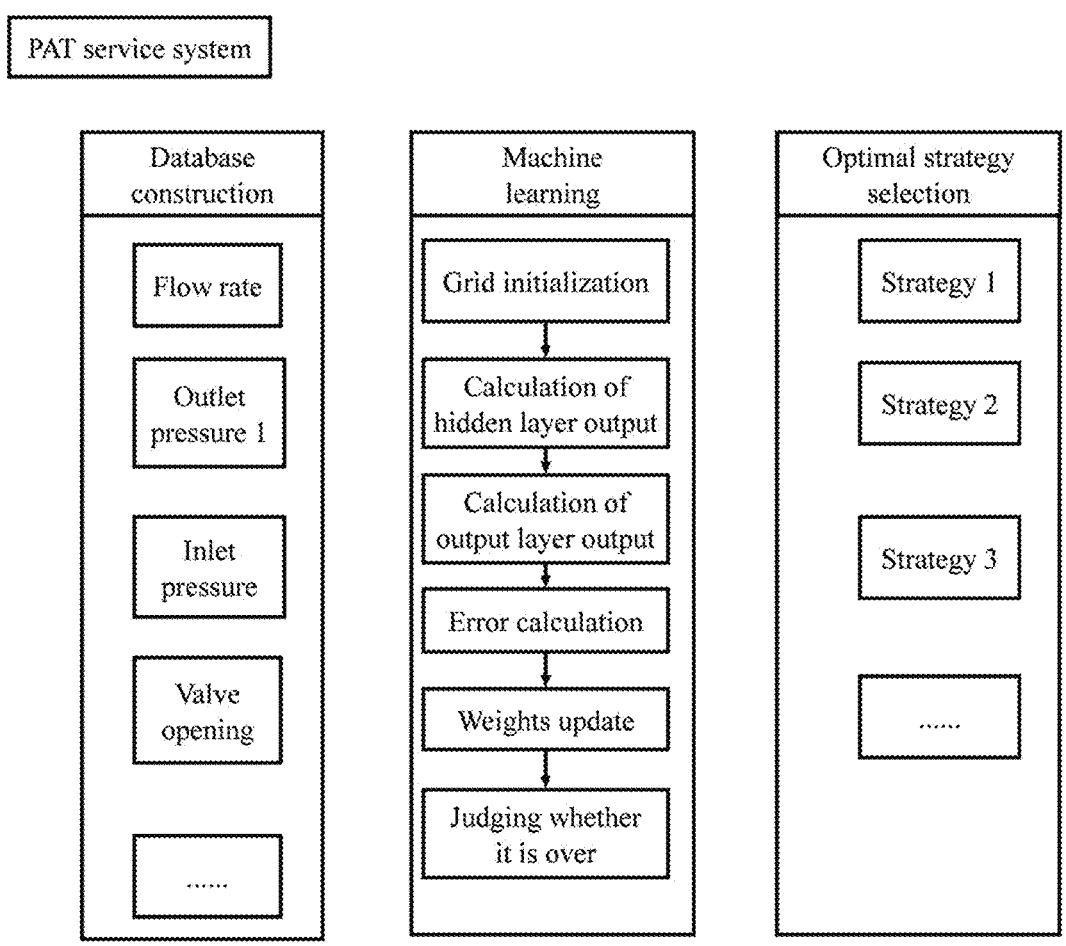
FIG. 4 is a schematic diagram of a PAT service system in an embodiment of the present disclosure.

As shown in FIGS. 1-4, this embodiment provides a test-bed for a pump as turbine transition process based on digital twinning, including:

a PAT physical model, a PAT service system, a PAT twinning virtual system and a PAT twinning data system.

The PAT physical model includes: a test-bed for pump as turbine transition process, including a PAT module, a booster pump module, a control system module and an acquisition module.

The booster pump module includes a lower water level tank, an electromagnetic valve, a booster pump, a static pressure sensor and an upper water level tank.

The PAT module includes a lower water level tank, a static pressure sensor, an electromagnetic valve, a flowmeter, an upper water level tank and a variable frequency motor.

The control system module includes a frequency converter, an energy feedback unit and an electric cabinet.

The acquisition module includes a static pressure sensor, a dynamic pressure sensor, a rotating speed torque sensor, an upper computer, an acquisition card and the rotating speed torque sensor.

The upper water level tank is arranged on the adjustable height bracket and provided with overflow holes, which are matched with the lower water level tank to keep the liquid height difference unchanged. The booster pump is mainly used to lift the water in the lower water level tank to the upper water level tank, so as to keep the water level in the upper water level tank at the overflow water level and ensure the stability of the water head. The flowmeter is installed at a pipe diameter 10 times from the upper water level tank to ensure an accuracy of flow rate measurement. The electromagnetic valve, through the calculation of PAT service system, the valve opening is accurately controlled by the control system, and the demand of power system is quickly responded. The flowmeter measures the flow rate data in the PAT physical model system and transmits the data to the PAT twinning data system through the acquisition card. The PAT is the core component of the physical model system, which meets the power consumption working condition of the water pump and the power generation working condition of the water turbine. A system fluctuation torque meter that may balance reactive power and active power in power system and reduce the fluctuation caused by unstable electric power input is mainly used to measure torque and transmit the torque value to twinning data. The frequency converter is used to adjust the rotating speed of PAT and booster pump.

The PAT service system includes a first part: giving an operation strategy for the transition of the operation state of the PAT physical model. The second part is to judge whether the results of numerical simulation of PAT twinning virtual system are safe and reasonable. The first part mainly includes: machine learning module and optimal strategy selection module. Machine learning module: determining the relationship among flow rate, outlet pressure, inlet pressure and valve opening through machine learning. Through the determined neural network model, according to the P' required by the power system, finding $(P'-P)/P'\leq 0.01$, finding the value of X according to P, that is, multiple groups of strategies, finding the current optimal strategy from multiple groups of strategies, extracting the valve opening of the strategies, and carrying out the following strategy optimization modes:

$Y$min=(valve 1 opening'−valve 1 opening)$^2$+(valve 2 opening'−valve 2 opening)$^2$ The second part: calculating the response time of the optimal strategy by judging the matching relationship between the valve opening and the adjustment time, and judging the rationality of the strategy selection. If the time is too long, the number of strategy groups will be re-selected.

By comparing the maximum pressure pulsation of the PAT virtual system with the maximum pressure pulsation and natural frequency that the unit may bear, the data may be exchanged with the PAT physical model under safe conditions.

The PAT virtual system includes numerical simulation module and dynamic display module: boundary condition calculation method, boundary condition adjustment method, numerical simulation method and result preprocessing method.

The dynamic display module includes a twin system interface of the test-bed and a real-time data dynamic change interface. The PAT virtual system is the digital twin of the PAT physical model, and the data in the PAT physical simulation system is transferred to the PAT virtual system through the PAT twinning data system, so that the initial state of the boundary in the PAT virtual system is highly consistent with the PAT physical model system. And the strategy scheme given by PAT service system is numerically simulated, and the torque value, power value and pressure pulsation vibration are output to PAT twinning data system. The PAT twinning data system transmits the values obtained from the numerical simulation of the PAT virtual system to the PAT service system, which judges the rationality and security of the strategy and then transmits the strategy to the PAT physical model.

The PAT twinning data system includes constructing a database, where the data is measured from the PAT physical model system, and the flow rate, outlet pressure, inlet pressure and valve opening data processed by the PAT twinning data system are added to the database as a set of states. The flow rate, pressure and torque values collected by the acquisition card are processed and transmitted to the PAT service system. In the PAT service system, the data is calculated and processed, and then transmitted to the PAT twinning data system. The PAT twinning data system then transmits this part of data to the PAT virtual system, the simulation is carried out first in the PAT virtual system, and then the simulated data is transmitted to the PAT twinning data system, and the data is transmitted to the PAT physical model through the PAT twinning data system. It is worth noting that the number of numerical simulation steps in PAT virtual system is small. This may not only ensure the response speed, but also predict the failure in advance.

This embodiment also provides a test method for pump as turbine transition process based on digital twinning, including the following steps.

Step 1: constructing a database, and constructing a database of pump as turbine transition process through the PAT physical model. Aiming at the constructed database, neural network learning method is applied to fit the mathematical model.

Step 2: in the PAT physical model, there are two branches. Water flow direction of PAT branch: upper water level tank-flowmeter-first static pressure sensor-first electromagnetic valve-PAT-second electromagnetic valve-second static pressure sensor-lower water level tank. Water flow direction of booster pump branch: lower water level tank-third electromagnetic valve-booster pump-fourth electromagnetic valve-static pressure sensor 3-upper water level tank. First, opening the third electromagnetic valve in the booster pump branch, and starting the booster pump. When the whole pump cavity is filled with water, gradually opening the electromagnetic valve, and increasing the flow rate until it reaches the design flow rate. When the water flow in the booster pump branch fills the whole upper water level tank, the first electromagnetic valve and the second electromagnetic valve are controlled so that after the rotating speed of the pump as turbine reaches 90% of the rated rotating speed, the excitation function of the motor is started to generate stable voltage. Adjusting the first electromagnetic valve and the second electromagnetic valve to make the power reach the current test power.

Step 3: the data in the PAT physical model at this time is transmitted to the PAT twinning virtual system through the PAT twinning data system, and the corresponding CFX Command Language (CCL) language is formed by using Python language, and the CCL language is imported into the ANSYS Workbech platform, and the working condition of PAT's current test power is numerically simulated by using this platform.

Step 4: passing the simulated power system requirements target to the PAT service system through the PAT twinning data system. Using the database established in the Step 1, according to the simulated target working condition and the mathematical model obtained by neural network, the corresponding strategy is found. Limited to 30 group strategies, stopping looking for strategies.

Step 5: selecting the optimal strategy. The optimal evaluation index is shown in the following formula.

$$Y = (\text{valve 1 opening}' - \text{valve 1 opening})^2 + (\text{valve 2 opening}' - \text{valve 2 opening})^2,$$

where the valve 1 opening' is valve 1 target opening, and the valve 1 opening is valve 1 current opening; and the valve 2 opening' is valve 2 target opening, and the valve 2 opening is valve 2 current opening.

Step 6: passing the optimal strategy data value to the PAT virtual system. In PAT virtual system, the change value of valve opening is split, and the split index is that the change rate $\theta$ does not exceed 3%.

$$\theta = \frac{Op_d - Op}{Op},$$

in the formula, $Op_d$ represents the valve opening at the moment after splitting, and Op represents the valve opening at the moment before splitting.

Step 7: the split valve opening is converted into CCL language by Python language, and the CCL language is imported into ANSYS Workbech platform, and the previous working condition is taken as the initial working condition to form the numerical simulation calculation of the transition process. The calculation results are transmitted to the PAT service system through the PAT twinning data system.

Step 8: in the PAT service system, evaluating the pressure pulsation value generated in the transition process of numerical simulation, making sure that the amplitude of the pressure pulsation is within a safe range, and ensuring that the frequency of the pressure pulsation is different from the resonance frequency of the unit, and then transferring the new valve opening to the PAT physical model.

Step 9: transferring the operating data of the PAT physical model to the PAT service model through the twinning data model, updating the database, and repeating the Steps 1 to 9 until it reaches the target working condition.

Embodiment 2

This embodiment provides a test-bed for pump as turbine transition process based on digital twinning, including:
an upper water level tank, a lower water level tank, a static pressure sensor, an electromagnetic valve, a flowmeter, a PAT, a booster pump, a frequency converter, a control cabinet, an energy feedback unit, an electric cabinet, a rotating speed torque sensor, a sensor, an upper computer and an acquisition card.

The upper and lower water level tank: connecting the water inlet pipeline and the water outlet pipeline, so that $$H = H_{Overflow} - H_1,$$

where His the water head; $H_{Overflow}$ is the height of the overflow hole of the upper water level tank, which remains unchanged; and $H_1$ is the height of the lower water level tank, which remains unchanged, so H remains stable.

The booster pump is mainly used to lift the water in the lower water level tank to the upper water level tank, so that the water level in the upper water level tank is always kept at the overflow water level and the stability of the water head is ensured. The flowmeter is installed at a pipe diameter 10 times from the upper water level tank to ensure an accuracy of flow rate measurement.

The electromagnetic valve, through the calculation of PAT service system, the valve opening is accurately controlled by the control system, and the demand of power system is quickly responded.

The flowmeter measures the flow rate data in the PAT physical model system and transmits the data to the PAT twinning data system through the acquisition card.

The PAT is the core component of the physical model system, which not only meets the power consumption working condition of the water pump, but also meets the power generation working condition of the water turbine. It may balance the reactive power and active power in the power system and reduce the system fluctuation caused by unstable electric power input.

The rotating speed torque sensor is mainly used to measure torque and transmit the torque value to twinning data.

The variable frequency motor is used to adjust the rotating speed of PAT. By adjusting the rotating speed, the stored or consumed power may be adjusted.

$$P = 9.81Q(H_2 - H_1) * \eta_t$$

The disclosure mainly designs a test-bed for pump as turbine transition process based on digital twinning. The test-bed mainly includes four systems, namely PAT physical model system, PAT virtual system, PAT service system and PAT twinning data system. These four systems cooperate with each other, providing a good way for the test and operation of PAT transition process.

The twinning data is the twinning center of the whole number, including collected data, simulation data and a database.

The flow rate, pressure and torque values collected by the acquisition card are processed and transmitted to the PAT service system. In the PAT service system, the data is calculated and processed, and then transmitted to the PAT twinning data system. The PAT twinning data system then transmits this part of data to the PAT virtual system, the simulation is carried out first in the PAT virtual system, and then the simulated data is transmitted to the PAT twinning data system, and the data is transmitted to the PAT system through the PAT twinning data system. It is worth noting that the number of numerical simulation steps in PAT virtual system is small. This may not only ensure the response speed, but also predict the failure in advance.

The PAT virtual system is the digital twin of PAT physical model, including a numerical simulation module and a dynamic display module. The numerical simulation module includes: boundary condition calculation method, boundary condition adjustment method, numerical simulation method and result preprocessing method.

The dynamic display module includes a twin system interface of the test-bed and a real-time data dynamic change interface. The data in the PAT physical simulation system is transferred to the PAT virtual system through the PAT twinning data system, so that the initial state of the boundary in the PAT virtual system is highly consistent with the PAT physical model system. And the strategy scheme given by PAT service system is numerically simulated, and the torque value, power value and pressure pulsation vibration are output to PAT twinning data system. The PAT twinning data system transmits the values obtained from the numerical simulation of the PAT virtual system to the PAT service system, which judges the rationality and security of the strategy and then transmits the strategy to the PAT physical model.

The PAT service system is a digital twin decision-making layer, which mainly includes two parts. The first part: giving an operation strategy for the transition of the operation state of the PAT physical model. The second part is to judge whether the results of numerical simulation of PAT twinning virtual system are safe and reasonable. The first part mainly includes: machine learning module and optimal strategy selection module. Machine learning module: determining the relationship among flow rate, outlet pressure, inlet pressure and valve opening through machine learning. Through the determined neural network model, according to the P' required by the power system, finding (P'−P)/P'≤0.01, finding the value of electromagnetic valve opening according to P, that is, multiple groups of strategies, finding the current optimal strategy from multiple groups of strategies, extracting the valve opening of the strategies, and carrying out the following strategy optimization modes:

$$Y\text{min} = (\text{valve 1 opening}' - \text{valve 1 opening})^2 +$$
$$(\text{valve 2 opening}' - \text{valve 2 opening})^2$$

The second part: calculating the response time of the optimal strategy by judging the matching relationship between the valve opening and the adjustment time, and judging the rationality of the strategy selection. If the time is too long, the number of strategy groups will be re-selected.

By comparing the maximum pressure pulsation of the PAT virtual system with the maximum pressure pulsation and natural frequency that the unit may bear, the data may be exchanged with the PAT physical model under safe conditions.

Embodiment 3

This embodiment provides a test-bed for pump as turbine transition process based on digital twinning, including the following steps.

In this embodiment, when the current PAT physical model is at the power of the water turbine operating working condition of 2 kilowatts (Kw), the power system requires the power of the target operating working condition of the water turbine to be 3 Kw.

Step 1: constructing a database. By adjusting the variable frequency motor through the control cabinet, the corresponding relationships between multiple groups of electromagnetic valves i (i=1, 2, 3, 4), static pressure sensor i (i=1, 2, 3), torque value, flowmeter, upper and lower water level difference and power value are obtained respectively. When PAT is set as the working condition of water pump, the power value is negative. When PAT works as a turbine, the power value is positive. 80 groups of data are collected for positive power value and negative power rate value respectively. These data are transmitted to the PAT service system through the PAT twinning data system. Creating database through MySQL system in PAT service system.

Step 2: applying the method of machine learning to the database established in the Step 1 to establish a mathematical model. The main steps are as follows.

1. Grid initialization: the data X and power P extracted from the database determine the number of neurons in the input layer, hidden layer and output layer of the grid. Setting connection weights $v_{ij}$ and $w_{jk}$ at each node between input layer and hidden layer, hidden layer and output layer. Initializing hidden layer threshold value a and output layer threshold value b.

2. Calculation of hidden layer output:

$$y_i = f\left(\sum_{j=1}^{n} v_{ij}x_i - a_j\right) = f\left(\sum_{j=0}^{n} v_{ij}x_i\right) \ i = 1, 2, \ldots, 5,$$

in the formula, $v_{i0}=-1$, $x_0=a_j$; and f(x) is the transfer function of the hidden layer.

$$f(x) = \frac{1}{1+e^{-x}}.$$

3. Calculation of output layer output:

$$O_k = f\left(\sum_{j=1}^{m} w_{jk}x_j - b_k\right) = f\left(\sum_{j=0}^{m} w_{jk}x_j\right) \ k = 1, 2, \ldots, l.$$

4. Error calculation:

$$E = \frac{1}{2}(D-O)^2 = \frac{1}{2}\sum_{k=1}^{l}(d_k - o_k)^2 \ k = 1, 2, \ldots, l.$$

5. Weights update:

$$v_{ij} = v_{ij} + \Delta v_{ij} \ w_{jk} = w_{jk} + \Delta w_{jk},$$

$$\Delta v_{il} = \eta\left(\sum_{k=1}^{l} \delta_k^o w_{jk}\right) y_j (1-y_j) x_i,$$

$$\Delta w_{jk} = \eta \delta_k^o y_j,$$

$$\delta_k^o = (d_k - o_k) o_k (1 - o_k),$$

where η is the learning rate.

6. When the model error is less than 0.01, the update is finished.

Step 3: adjusting the electromagnetic valve i (i=1, 2, 3, 4), static pressure sensor i (i=1, 2, 3), torque value, flowmeter, and upper and lower water level difference, so that the PAT physical model is in the water turbine working condition, and the power is positive 2 Kw. In the PAT physical model, there are two branches. The water flow direction of PAT branch: upper water level tank-flowmeter-first static pressure sensor-first electromagnetic valve-PAT-second electromagnetic valve-second static pressure sensor-lower water level tank. Water flow direction of booster pump branch: lower water level tank-third electromagnetic valve-booster pump-fourth electromagnetic valve-static pressure sensor 3-upper water level tank. The flow rate of PAT branch is 21.3 cubic meter per hour (m³/h), the booster pump outlet in the booster pump branch is controlled by the control cabinet as a fixed pressure outlet, with the outlet pressure set at 1.5×10⁵ Pascal (Pa), and the tank difference between the upper and lower water levels is 5 meters (m).

Step 4: the data in the PAT physical model at this time is transmitted to the PAT twinning virtual system through the PAT twinning data system, a corresponding CCL language is formed by using Python language, the CCL language is imported into the ANSYS Workbech platform, and the working condition of the water turbine with the PAT power of positive 2 Kw is numerically simulated by using this platform.

Step 5: the PAT twinning data system transfers the power system requirements target, that is, the transition to the working condition of the water turbine with a working condition of positive 3 Kw, to the PAT service system. In the mathematical model established in the Step 2, according to the target working condition, the corresponding strategies are searched, and the search for strategies is stopped within 30 groups of corresponding strategies.

Step 6: selecting the optimal strategy. The optimal evaluation index is shown in the following formula.

$Y$=(valve 1 opening'−valve 1 opening)²+(valve 2 opening'−valve 2 opening)², where the valve 1 opening' is valve 1 target opening, and the valve 1 opening is valve 1 current opening; and the valve 2 opening' is valve 2 target opening, and the valve 2 opening is valve 2 current opening.

Step 7: passing the optimal strategy data value to the PAT virtual system. In PAT virtual system, the change value of valve opening is split, and the split index is that the change rate θ does not exceed 3%.

$$\theta = \frac{Op_d - Op}{Op},$$

in the formula, $O_{p_d}$ represents the valve opening at the moment after splitting, and $O_p$ represents the valve opening at the moment before splitting.

Step 8: the split valve opening is converted into CCL language by Python language, and the CCL language is imported into ANSYS Workbech platform, and the previous working condition is taken as the initial working condition to form the numerical simulation calculation of the transition process. The calculation results are transmitted to the PAT service system through the PAT twinning data system.

Step 9: in the PAT service system, evaluating the pressure pulsation value generated in the transition process of numerical simulation, making sure that the amplitude of the pressure pulsation is within a safe range, and ensuring that the frequency of the pressure pulsation is different from the resonance frequency of the unit, and then transferring the new valve opening to the PAT physical model.

Step 10: transferring the operating data of the PAT physical model to the PAT service model through the twinning data model, updating the database, and repeating the Steps 1 to 9 until it reaches the target working condition.

The above are only better specific embodiments of this disclosure, but the protection scope of this disclosure is not limited to this. Any change or replacement that may be easily thought of by a person familiar with this technical field within the technical scope disclosed in this disclosure should be covered by this disclosure. Therefore, the protection scope of this disclosure should be based on the protection scope of the claims.

What is claimed is:

1. A test-bed for a pump as turbine transition process based on digital twinning, comprising: a pump as turbine (PAT) physical model, a PAT service system, a PAT twinning virtual system and a PAT twinning data system;
   the PAT physical model comprises a PAT module, a booster pump module, a control system module and an acquisition module;
   wherein the PAT module comprises a lower water level tank, a static pressure sensor, at least two valves including a first valve (valve 1) and a second valve (valve 2), a flowmeter, an upper water level tank and a motor;
   the booster pump module comprises the lower water level tank, the valves, a booster pump, the static pressure sensor, and the upper water level tank;
   the control system module comprises a frequency converter, an energy feedback unit and an electric cabinet; and
   the acquisition module comprises the static pressure sensor, a dynamic pressure sensor, a rotating speed torque sensor, an upper computer, and an acquisition card, wherein the PAT physical model is used for controlling the pump as turbine transition process and collecting data of the pump as turbine transition process;
   the PAT twinning data system is used for processing the data of the pump as turbine transition process to obtain a measurement database;
   the PAT twinning virtual system is used for carrying out numerical simulation on the pump as turbine transition process based on the measurement database to obtain a value obtained by numerical simulation of a PAT virtual system; and
   the PAT service system is used for processing the value obtained by the numerical simulation of the PAT virtual system, obtaining an optimal operation strategy and feeding the strategy back to the PAT physical model, and updating the measurement database at a same time until a target working condition is reached;
   wherein the PAT service system comprises: a machine learning module, an optimal strategy selection module and a judgment module;
   wherein the machine learning module is used for determining relationships among flow rate, outlet pressure, inlet pressure and valve opening through machine learning, and constructing a neural network model;
   the optimal strategy selection module is used for searching a corresponding strategy through the neural network model and obtaining the optimal operation strategy; and
   the judgment module is used for judging a matching relationship between the valve opening and adjustment time, calculating response time of the optimal strategy and judging a rationality of a strategy selection;
   an expression of a strategy optimization mode of the optimal strategy selection module is:

$Y\min=(\text{valve 1 opening'}-\text{valve 1 opening})^2+(\text{valve 2 opening'}-\text{valve 2 opening})^2$;

wherein the valve 1 opening' is valve 1 target opening, and the valve 1 opening is valve 1 current opening; and the valve 2 opening' is valve 2 target opening, the valve 2 opening is valve 2 current opening, and Ymin is an evaluation index; and
   the PAT service system is also used for evaluating a pressure pulsation value generated in the transition process of the numerical simulation, determining that an amplitude of a pressure pulsation is within a safe range, and after ensuring that a frequency of the pressure pulsation is inconsistent with a resonance frequency of a unit, transmitting a new valve opening command to the PAT physical model to operate the valve 1 and the valve 2 to adjust water flow between the upper and lower tanks, and initiate the motor excitation to generate stable voltage.

2. The test-bed for the pump as turbine transition process based on the digital twinning according to claim 1, wherein the upper water level tank is arranged on an adjustable height bracket and is provided with an overflow hole for cooperating with the water level tank to keep a liquid height difference unchanged;
   the booster pump is used for lifting water in the lower water level tank into the upper water level tank to keep a water level in the upper water level tank at an overflow water level; and
   the flowmeter is installed at a pipe diameter 10 times from the upper water level tank to ensure an accuracy of flow rate measurement.

3. The test-bed for the pump as turbine transition process based on the digital twinning according to claim 1, wherein the PAT twinning data system is also used to add data of the flow rate, the outlet pressure, the inlet pressure and the valve opening as a set of states to a database, and at the same time, the flow rate, pressure and torque values collected by the acquisition card are processed and transmitted to the PAT service system.

4. The test-bed for the pump as turbine transition process based on the digital twinning according to claim 1, wherein the PAT twinning virtual system comprises a numerical simulation module and a dynamic display module;

wherein the numerical simulation module is used for simulating the measurement database through a boundary condition calculation method, a boundary condition adjustment method, a numerical simulation method and a result preprocessing method; and the dynamic display module is used to display a twin system interface of the test-bed and a real-time data dynamic change interface.

\* \* \* \* \*